US005735630A

United States Patent [19]

Keathley et al.

[11] Patent Number: 5,735,630

[45] Date of Patent: Apr. 7, 1998

[54] STRIKING TOOL HEAD SYSTEM AND COMMON ELONGATED HANDLE FOR MULTIPLE TOOL HEAD ASSEMBLIES

[75] Inventors: Bob N. Keathley, Bernie, Mo.; John A. Waddell, Reedsville, Pa.

[73] Assignees: IXL Mfg. Co., Inc., Bernie, Mo.; Mann Edge Tool Co., Lewistown, Pa.

[21] Appl. No.: 437,999

[22] Filed: May 10, 1995

[51] Int. Cl.[6] ................................ B25G 3/00; F16B 3/06

[52] U.S. Cl. ........................... 403/334; 403/24; 403/371; 403/372; 81/177.7; 81/177.8; 30/340; 172/371

[58] Field of Search .................................... 403/365, 367, 403/368, 371, 372, 220, 225, 226, 24, 333, 334; 81/177.8, 177.7; 30/308.1, 308.2, 340, 342, 308.3; 172/371, 372; 294/57

[56] References Cited

U.S. PATENT DOCUMENTS

| | | | |
|---|---|---|---|
| 374,483 | 12/1887 | Maloney | 30/308.1 X |
| 379,439 | 3/1888 | Bell | 30/308.1 X |
| 635,185 | 10/1899 | Regan | 30/308.1 X |
| 673,772 | 5/1901 | Hall | 30/308.1 X |
| 822,006 | 5/1906 | Lyons | 30/308.1 X |
| 899,487 | 9/1908 | Gordon | 30/308.1 X |
| 914,554 | 3/1909 | Cooley et al. | 30/308.1 X |
| 1,315,943 | 9/1919 | Brockbank . | |
| 1,508,395 | 9/1924 | Isahm . | |
| 1,662,500 | 3/1928 | Henneck | 294/57 X |
| 1,791,688 | 2/1931 | Sparks . | |
| 1,914,802 | 6/1933 | Cochrane . | |
| 2,067,751 | 1/1937 | Beegle . | |
| 2,318,193 | 5/1943 | Branham | 403/334 X |
| 2,340,619 | 2/1944 | Schwarzmayr | 30/308.1 X |
| 2,433,974 | 1/1948 | Antel | 403/333 |
| 2,656,225 | 10/1953 | Saylor . | |
| 2,831,202 | 4/1958 | Lay | 81/20 X |
| 2,837,381 | 6/1958 | Sarlandt . | |
| 2,917,349 | 12/1959 | Saylor et al. . | |
| 3,712,659 | 1/1973 | Kneissl . | |
| 4,334,563 | 6/1982 | Epel et al. | 30/308.1 |
| 4,344,901 | 8/1982 | Keathley . | |
| 4,352,381 | 10/1982 | Provi | 30/308.1 |
| 4,585,370 | 4/1986 | Rose | 403/334 |
| 5,272,788 | 12/1993 | Gilstrap | 403/343 X |

FOREIGN PATENT DOCUMENTS

| | | | |
|---|---|---|---|
| 1984 | of 1878 | United Kingdom | 294/57 |
| 846702 | 8/1960 | United Kingdom | 81/22 |

*Primary Examiner*—Harry C. Kim
*Attorney, Agent, or Firm*—Neil F. Markva

[57] ABSTRACT

A striking tool assembly comprises a tool head including a tool eye having disposed therein a sleeve member for receiving an elongated tool handle to perform a manual tool work operation. A flexing structure enables the annular wall structure of the sleeve member to temporarily collapse inwardly for a retaining section to be located in a sleeve securing position when the sleeve member is moved in a longitudinal axial direction into the tool head eye. The sleeve member includes a tool eye mating portion and an overstrike portion. The tool head system comprises a plurality of tool heads each of which is effective to perform a different manual work operation. The sleeve member of each tool head assembly has an inner tapered bore including an inner frictionally mating surface effective to frictionally mate with a preselected elongated tool handle, which may be used interchangeably with each tool head of the tool head system. The plurality of forged tool heads each includes a tool eye for receiving a tool handle structure to form a striking tool. Each tool eye includes a continuous tapered interior surface having a top aperture at an upper surface of each tool head and a substantially identically dimensioned bottom aperture at a lower surface of each tool head.

37 Claims, 11 Drawing Sheets

Fig. 1
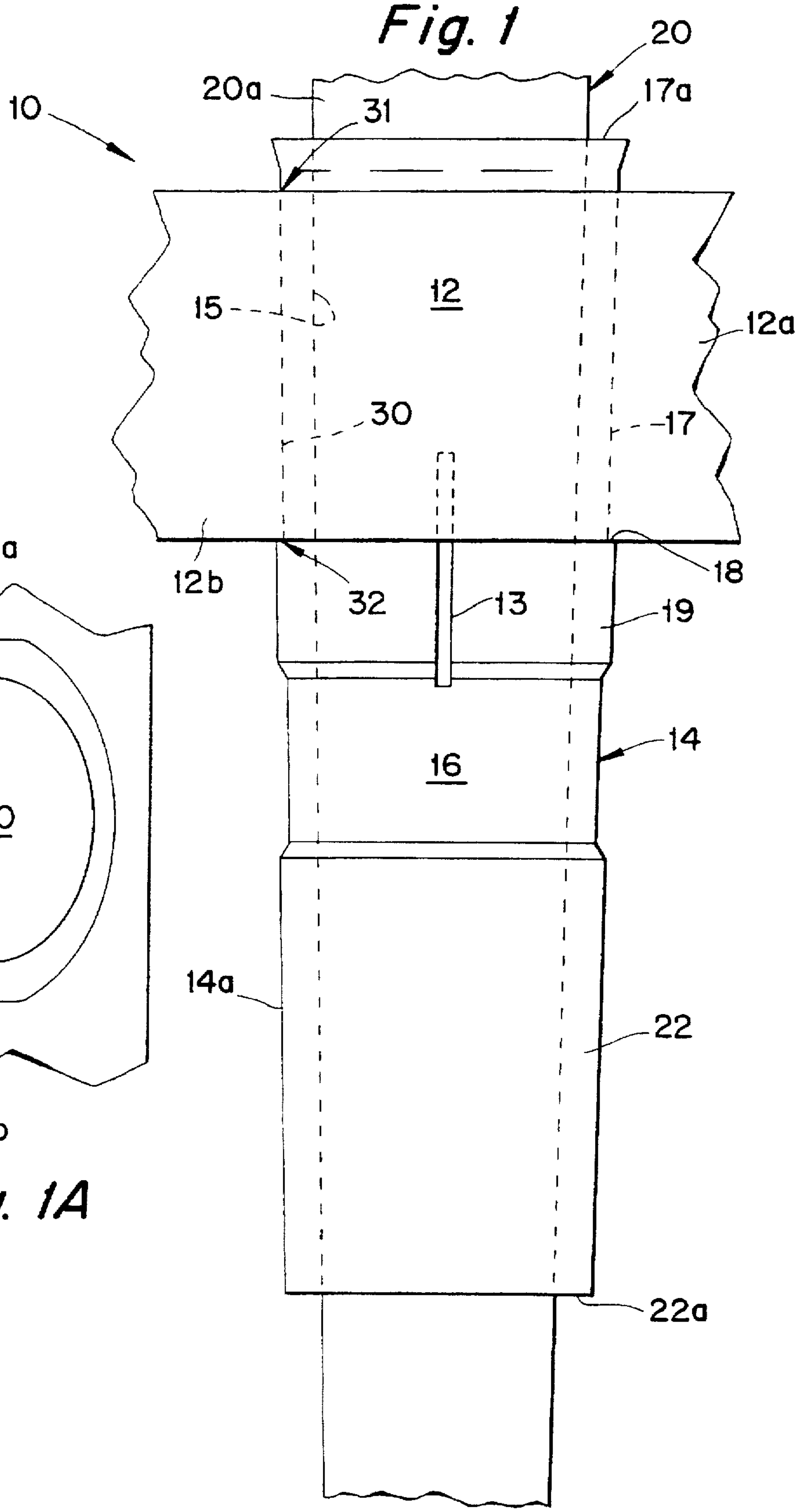
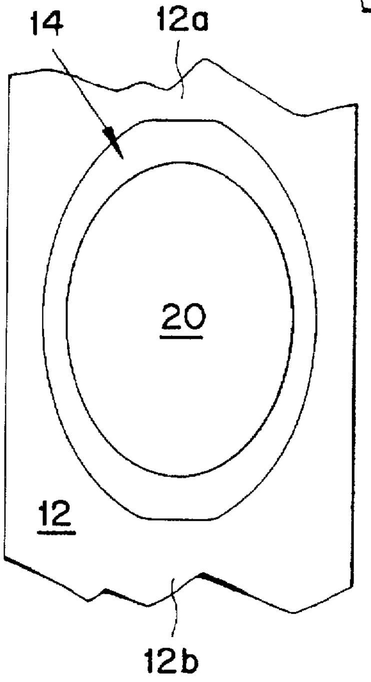
Fig. 1A

Fig. 18
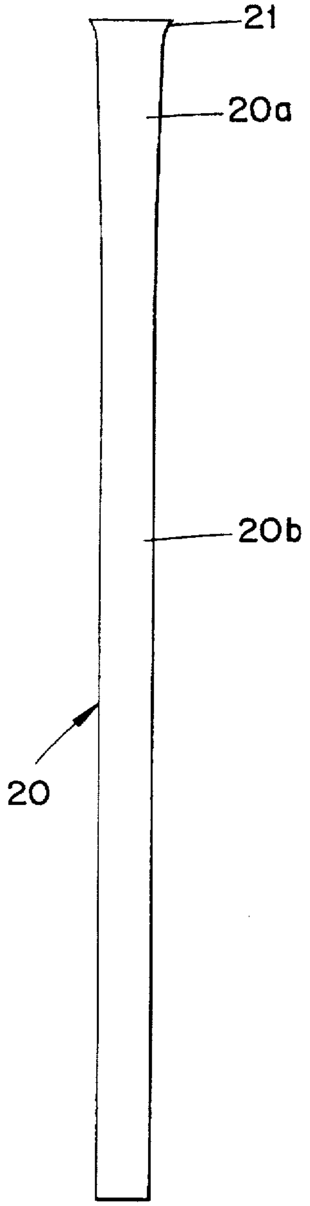
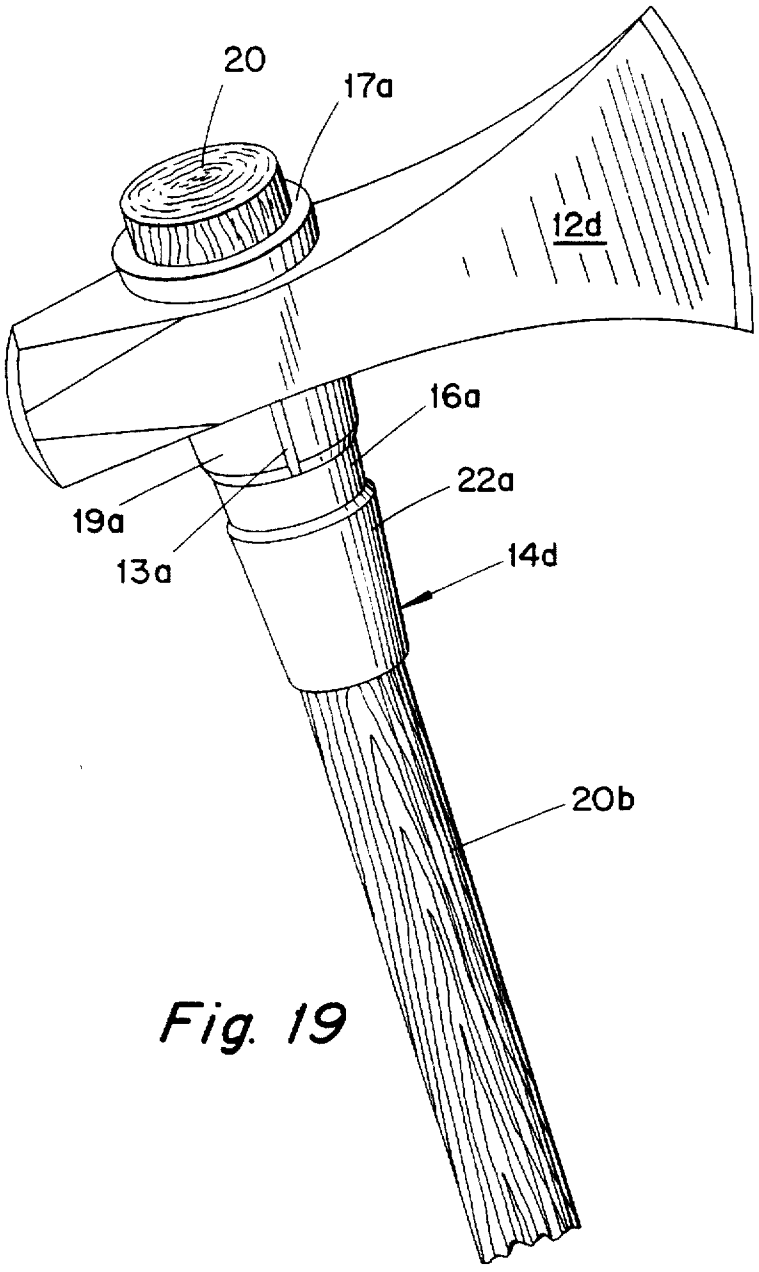
Fig. 19

STRIKING TOOL HEAD SYSTEM AND COMMON ELONGATED HANDLE FOR MULTIPLE TOOL HEAD ASSEMBLIES

FIELD OF THE INVENTION

This invention relates generally to light and heavy-striking tools. More particularly, the invention relates to a system of striking tools and handles therefor having a standardized wood or synthetic tool handle member useful with a multiple number of tool heads including a maul, an axe, a sledge, a hammer, a pick, a garden mattock and the like.

BACKGROUND OF THE INVENTION

Solid wood tool handles for sledges, hammers, pick axes, mauls, and the like are still made of Hickory wood which is the most popular wood for such hand tools. The supply of Hickory is still severely limited and the industry is always looking for ways to be able to use Hickory wood more efficiently or to find an appropriate material for a wood substitute.

U.S. Pat. No. 4,344,901 addresses the problem of the short supply of wood and shows the use of an elongated wood tool handle with a synthetic material tool holding section molded directly to the wood at its tool supporting end. The molded pick axe tool holding section is tapered to slip into the top of the forged pick axe tool head. Differently shaped molded tool supporting sections are used for the pick axe handle, single bit axe handle and double bit axe handle.

U.S. Pat. Nos. 2,067,751; 2,656,225; and 2,917,349 each discloses a means for securing tool handles to tools including the use of resilient materials between the elongated tool handle member and the eye of the tool head. Each of the different tool heads has a different shaped tool eye depending on the particular forged tool head.

U.S. Pat. Nos. 2,837,381 and 3,712,659 disclose the use of a synthetic material disposed around a core and placed through the pick axe head as shown.

U.S. Pat. No. 1,315,943 shows a tapered sleeve having spring lugs for maintaining its position within the sleeve that telescopically fits over the end of an elongated tapered handle member which is held in place by a bolt. A lug physically pried outwardly from the metallic sleeve holds the head in place on the tapered sleeve member.

U.S. Pat. No. 1,914,802 is directed to a tool handle securing sleeve member having a tongue element effective to resist movement of the tool head when the handle is disposed in the tapered eye of a pick axe. This patent recognizes that the pick is one of the few hand tools where the handle is inserted in the tool head by passing the entire handle through the tool eye. Thus, the swinging operation of the tool in use causes tightening of the tool head on the tapered handle.

The various other striking tools such as an axe, a maul, and a sledgehammer and the like are inserted from the bottom side of the tool head and forced inwardly toward the top of the tool head. Wedge members may be driven into the end of the inserted tool end of a wood handle. Epoxy material is used to bond the tool head to the end of a tool handle of synthetic material such as fiberglass.

U.S. Pat. 1,791,688 discloses a miner's pick having an overstrike sleeve member to shield the portion of the handle that is closest to the tool head thereby preventing the handle from being quickly worn away and weakened to failure.

PURPOSE OF THE INVENTION

The primary object of the invention is to provide a striking tool head system comprising a variety of tool heads while maintaining a common elongated tool handle for a variety of manual striking tools.

Another object of the invention is to provide a striking tool head assembly comprising a combination of a tool head and sleeve member, which receives an elongated tool handle member that is interchangeable with other tool head assemblies.

A further object is directed to a tool head assembly having an adapter sleeve that fits a plurality of tool heads with each tool head being effective to perform a different manual tool operation.

A still further object of the invention is to provide a striking tool head system wherein each of a plurality of tool heads performs a different function but has a similarly shaped tool eye that fits each tool head for receiving a commonly used sleeve member.

SUMMARY OF THE INVENTION

The invention is directed to a tool head system in which a pre-selected elongated tool handle means has a structural configuration effective for use with each of a plurality of tool head means for performing different respective manual work operations. The system comprises a plurality of toolshead means effective to perform different manual work operations. Each tool head means includes sleeve means and a tool eye for receiving the sleeve means to form a striking tool head assembly.

Each tool eye includes a continuous interior surface having a top aperture at an upper surface of each tool head means and a bottom aperture at a lower surface of each tool head means. Each sleeve means is effective to receive the preselected elongated tool handle means into each said tool head striking assembly for performing a manual work operation. Each sleeve means includes an annular wall structure having an exterior surface and an inner tapered bore surface that is tapered inwardly from the sleeve top free end having a top opening to a sleeve bottom free end having a smaller bottom end opening.

The sleeve inner tapered bore surface is effective to frictionally mate with the preselected elongated tool handle means when the tool handle means moves in a longitudinal axial direction into the sleeve top opening and out of the sleeve bottom end opening. The exterior surface of each sleeve means includes a tool eye mating portion and an overstrike portion which projects downwardly from the lower surface of the tool head means along the tool handle means that is mated frictionally with the sleeve inner tapered bore surface.

A feature of the invention is directed to a protracted annular wall structure of sleeve means, which includes retaining means for securing the location of the sleeve means in the tool eye of each tool head means when each sleeve means is slidingly inserted into the tool eye. The retaining means is disposed at a location intermediate to outer free ends of each respective annular wall structure for securing each sleeve means in a sleeve means securing position. Each sleeve means includes flexing means for enabling the annular wall structure to temporarily collapse inwardly when the sleeve means is moved in a longitudinal axial direction through the tool eye of a preselected tool head means.

The invention also features a structure wherein the tool eye of each tool head means has a continuous interior surface, which is tapered inwardly from the top aperture to the bottom aperture of each tool head means. The tool eye mating portion of each sleeve means is disposed in a sleeve means securing position when each sleeve means frictionally mates with the tapered interior surface of the tool eye of a preselected tool head means.

In a specific embodiment, the annular wall structure of the sleeve means includes a sleeve top end opening and a smaller bottom end opening. The inner tapered bore surface is effective to slidingly engage a tapered tool supporting surface of the elongated tool handle means and to frictionally secure an elongated interchangeable tool handle in a preselected striking tool head assembly. The overstrike portion of each sleeve means extends downwardly from retaining means, which is disposed intermediate the top outer free end and the bottom outer free end of each wall structure.

The retaining means of a specific embodiment includes a retaining ledge surface portion located in a plane that extends in a direction normal to a longitudinal axis of the wall structure. The tool eye mating surface is tapered from the top outer free end of each wall structure to the retaining ledge surface portion. The tool eye mating surface frictionally mates with the interior surface of each tool eye when the sleeve member is disposed in a sleeve means securing position within each respective tool head means. More specifically, each retaining ledge surface portion includes an annular shoulder surface. Flex slot means extends through the annular wall structure and in a direction transverse to a plane containing each respective annular shoulder surface.

A more specific feature of the disclosed tool head system includes a plurality of slot members extending completely through each annular wall structure of the sleeve means. The slot members are elongated, have closed ends, and extend in a direction parallel to the longitudinal axis of the sleeve means and across each retaining ledge surface portion. The inner tapered bore surface of each respective sleeve member forms an oval cross-section with major and minor axes.

Each wall structure includes opposing end wall sections that are located at opposite ends of each respective major axis and extend along a length of each sleeve means. A slot member is located in each of the opposing end wall sections. Opposing side wall sections are located at opposite ends of each minor axis and extend along the entire length of each sleeve means. A slot member is located in each of the opposing side wall sections.

Another feature of the invention is directed to an exterior surface of each annular wall structure having retaining means and damage control recess means. The retaining means is effective to secure the location of each respective sleeve means which is disposed in each respective tool eye. Each damage control recess means is located adjacent the retaining means and along each respective overstrike portion to prevent damage to the exterior of each wall structure when the sleeve moves through the tool eye of each respective tool head means.

The striking tool head assembly of the invention comprises tool head means including a tool eye having disposed therein a sleeve member for receiving an elongated tool handle to perform a manual tool work operation. The tool eye includes a continuous interior surface having a top aperture at an upper surface of the tool head mean and a bottom aperture at a lower surface of the tool head means. The sleeve member includes an annular wall structure having an inner tapered bore surface and an exterior surface, which includes a tool eye mating portion, an overstrike portion, and retaining means for securing the sleeve member in a sleeve securing position within the tool eye. Flexing means enable the annular wall structure to temporarily collapse inwardly for the retaining means to locate the sleeve member in a sleeve securing position when the sleeve member is moved in a longitudinal axial direction through the tool eye.

Another feature is directed to a plurality of forged tool heads each effective to perform a different manual work operation when combined with a preselected elongated tool handle member that is interchangeable with respect to each of the plurality of forged tool heads. The tool eye for each of the forged tool heads includes a continuous tapered interior surface having a top aperture at an upper surface of each tool head and a bottom aperture substantially identically dimensioned from one tool head to another at a lower surface of each tool head.

The elongated tool handle of the invention is interchangeable with each of a plurality of tool heads each including a sleeve member having a tapered outer surface fitted to a tool eye of a tool head and an inner tapered bore for frictionally mating with the tool handle. The tool handle comprises an elongated rod member having a structural configuration effective for interchangeable use with each of the plurality of tool head means. The rod member includes a top tapered tool head supporting section, and a straight handle portion projecting from the tool head supporting section to provide a manual grasping section. The tool head supporting section has an elliptically shaped cross-section with a major axis and a minor axis for frictionally mating with the inner tapered bore of each sleeve member to perform a manual work operation.

BRIEF DESCRIPTION OF THE DRAWINGS

Other objects of this invention will appear in the following description and appended claims, reference being made to the accompanying drawings forming a part of the specification wherein like reference characters designate corresponding parts in the several views, FIG. 1 is a fragmentary side elevational view of a tool head assembly made in accordance with the invention;

FIG. 1A is a fragmentary top plan view of the assembly shown in FIG. 1;

FIG. 18 is a side elevational view of an elongated wood or synthetic tool handle of the invention; and FIG. 19 is a fragmentary perspective view of an American style maul of the invention.

DETAILED DESCRIPTION

Figure 2:
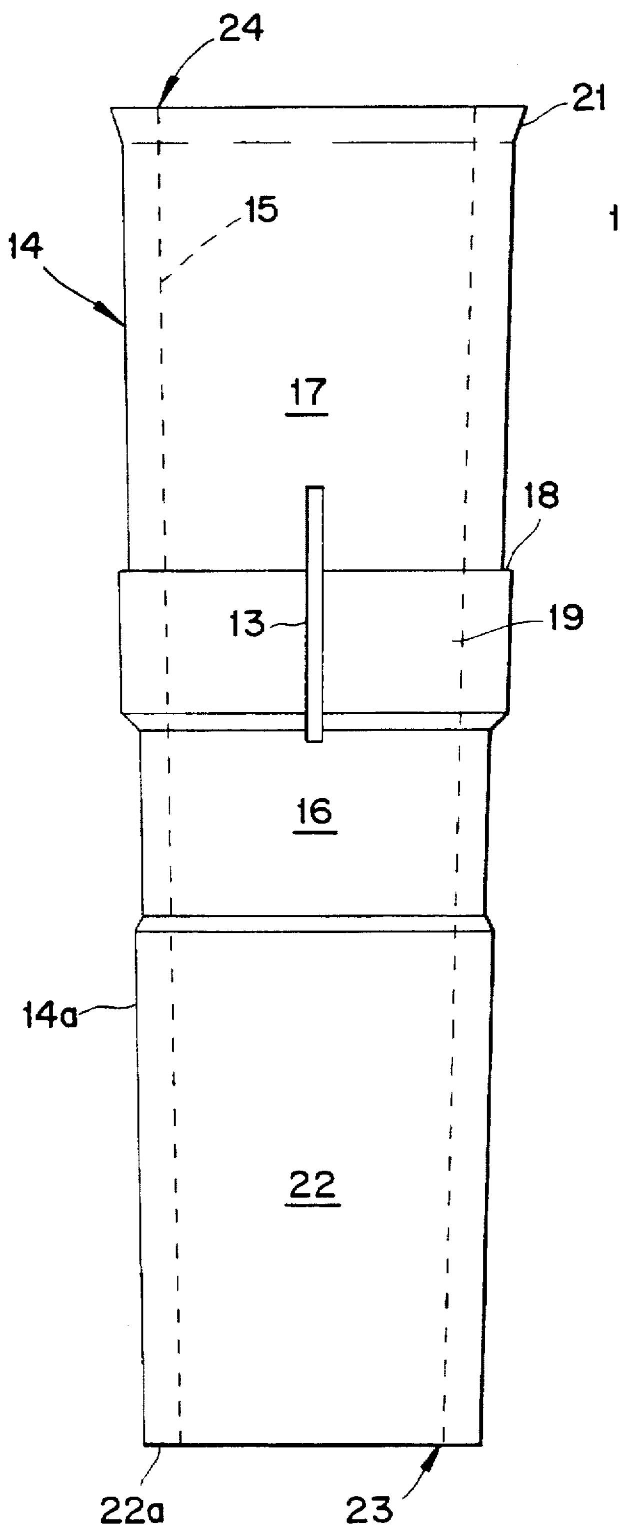
FIG. 2 is a side elevational view of a sleeve member made in accordance with the invention.
Figure 3:
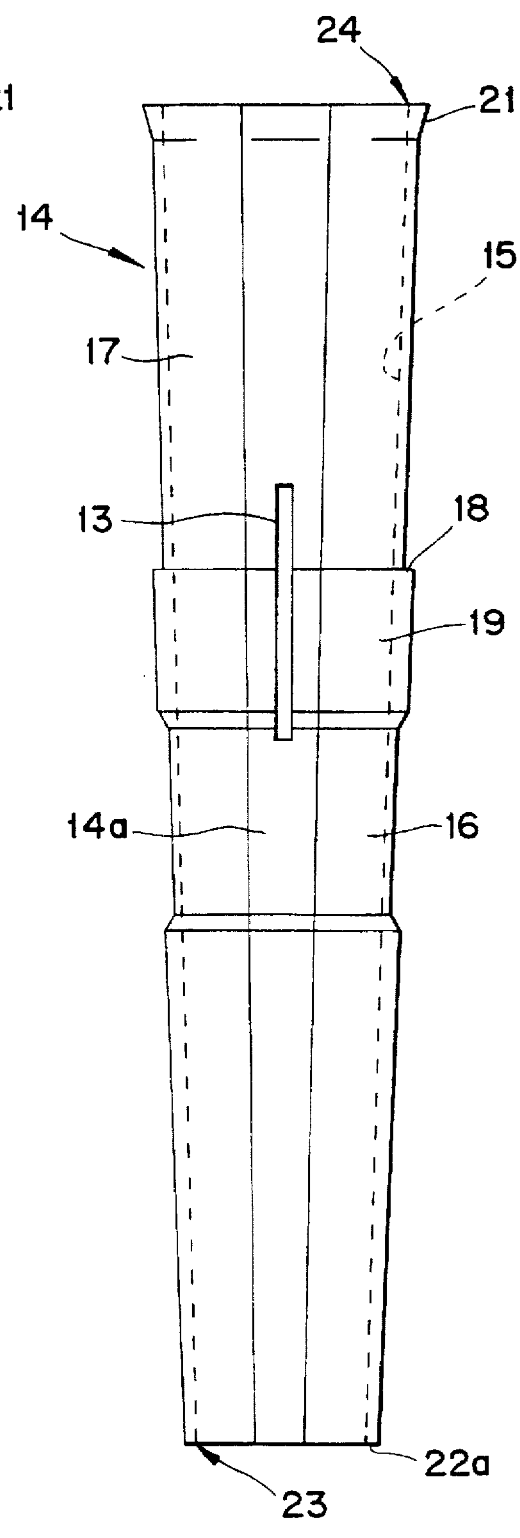
FIG. 3 is an end elevational view of the sleeve member of FIG. 2.
Figure 4:
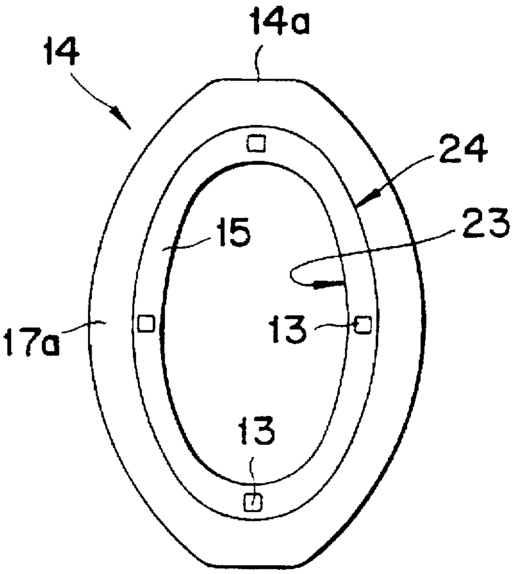
FIG. 4 is a top plan view of the sleeve member shown in FIG. 2.
Figure 5:
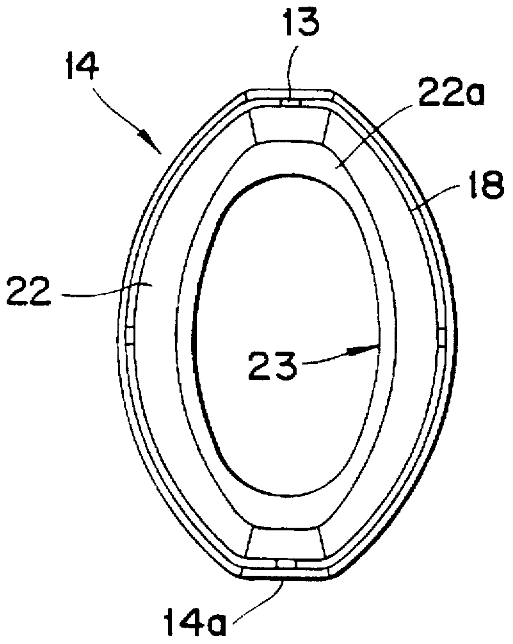
FIG. 5 is a bottom plan view of the sleeve member shown in FIG. 2.

The tool head assembly, generally designated 10, comprises a tool head 12 and a sleeve member, generally designated 14. Tool head 12 has two end sections 12a and 12b, which may be of differing configurations as depicted in FIGS. 7 through 16. Tool head assembly 10 is shown disposed on elongated tool handle 20 of the invention on each of the disclosed embodiments of a tool head. Tool handle 20 may be composed of wood or a synthetic material such as plastic.

Tool head 12 includes a continuous interior surface 30 which is tapered inwardly from top aperture 31 to bottom aperture 32. Top aperture 31 is at an upper surface of tool head 12 and bottom aperture 32 is at a lower surface of tool head 12.

Sleeve member 14 includes an annular wall structure having an inner tapered bore surface 15 and an exterior surface including a tool eye mating portion 17, an overstrike portion 22 and retaining portion 19 which includes an annular ledge 18 contiguously disposed to the lower surface of tool head 12 in a sleeve securing position as shown.

Continuous inner surface 30 is tapered inwardly through tool head 12 from top aperture 31 to smaller bottom aperture 32. Retaining ledge 18 is disposed at a location intermediate the two outer free ends of sleeve member 14 as shown. Sleeve member includes a sleeve top end opening 24 and a smaller bottom end opening 23 with an inner tapered bore surface 15 effective to slidingly receive elongated handle member 20. A tapered tool supporting surface 20a frictionally mates with inner tapered bore surface 15 when handle member 20 is slidingly moved in a longitudinal axial direction through sleeve 14 from the sleeve top end opening 24.

Overstrike portion 22 is tapered inwardly toward smaller bottom end opening 23 located about 5 inches from retaining section 19, which is disposed at a location intermediate a top outer free end 17a and a bottom outer free end 22a of sleeve member 14. Destructive testing results show that overstrike portion 22 extends the life of a Hickory handle in use by at least 5 times.

Retaining section 19 includes retaining ledge surface 18, which is in a plane that extends in a direction normal to a longitudinal axis of sleeve member 14. Tool eye mating portion 17 of sleeve member 14 is tapered from upper aperture or outer end 17a for about 2.5 inch to retaining ledge surface 18 and frictionally mates with interior surface 30 when disposed in the sleeve member securing position with retaining ledge surface 18 contiguously disposed to the lower surface of tool head 12. The upper end of sleeve 14 includes flared section 21 and extends upwardly from the upper surface of tool head 12 as shown. Handle member 20 projects upwardly from sleeve member 14 as shown.

Flex slots or slots member 13 extend in a direction transverse to a plane containing the annular shoulder surface 18. In this embodiment, four slot members 13 extend completely through the annular wall structure of sleeve member 14. Slot members 13 are elongated, have closed ends, and transversely extend across retaining ledge surface 18 and retaining section 19 as shown. Slot members 13 extend upwardly into eye mating portion 17 for about ½ inch above ledge surface 18.

Flex slot members 13 enable the annular wall structure of sleeve 14 to temporarily collapse inwardly for locating retaining portion 19 in a sleeve-securing position when sleeve member 14 is moved in a longitudinal axial direction into the top tool head eye aperture 31. The longitudinal force on tapered sleeve 14 causes inwardly directed forces to act toward the longitudinal axis thereby causing temporary collapse until ledge surface 18 passes through bottom aperture 32. Sleeve member 14 includes flattened end surfaces 14a along which flex slots 13 are disposed as shown.

The inner tapered bore surface 15 of sleeve 14 forms an oval cross-section with major and minor axes. A slot member 13 is located in the wall structure along the major and minor axes on opposite sides of sleeve member 14 as shown. The top opening 24 is 1¹¹⁄₁₆ inch (major axis) by 1⅛ inch (minor axis) and bottom opening 23 is 1⁹⁄₁₆ inch (major axis) by 1 inch (minor axis).

In this specific embodiment, the protracted annular wall structure of sleeve member 14 is about 8 inches long and includes a top outer free end section that projects upwardly from the upper surface of tool head 12 when sleeve member 14 is disposed in the sleeve securing position as shown in FIG. 1. The exterior surface of sleeve member 14 includes a surface damage control recess 16 located adjacent retaining portion 19 and along overstrike portion 22 to prevent damage to the exterior sleeve surface when sleeve member 14 is moved through the tool head eye.

The inner frictionally mating bore surface 15 slidingly engages a tapered tool supporting surface 20a to frictionally secure handle 20 within a preselected striking tool head assembly 10. This may include any one of the tool heads shown in FIGS. 7 through 17 and 19. Handle 20, in each instance, is placed grasping section 20b end first through sleeve top opening 24 until tool supporting surface 20a mates with the mating inner bore surface 15. The top end of handle 20 is then struck against a hard surface such as a concrete sidewalk to frictionally fixedly secure handle 20 in place. To remove tool head 12 from handle 20, the outer end of handle grasping section 20b may be struck against a hard surface forcing sleeve member 14 out of frictional contact with tool supporting section 20a.

Figure 6A:
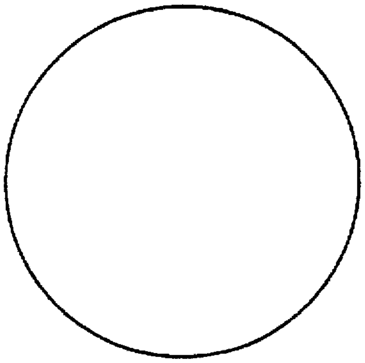
Fig. 6(a) PRIOR ART
FIGS. 6(*a*)–6(*e*) is a schematic view of a plurality of tool eye cross-sections used in prior art tool heads.
Figure 6B:
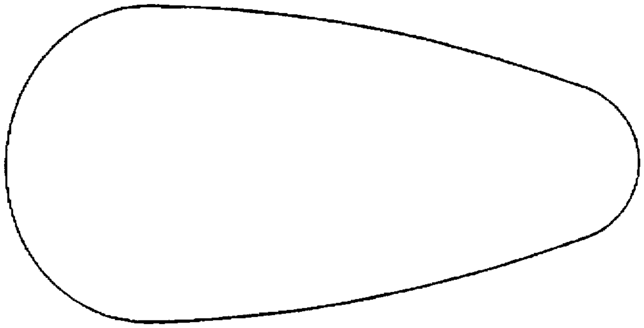
Fig. 6(b) PRIOR ART
Figure 6C:
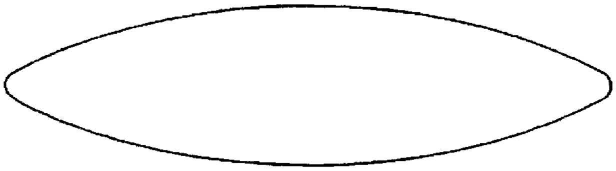
Fig. 6(c) PRIOR ART
Figure 6D:
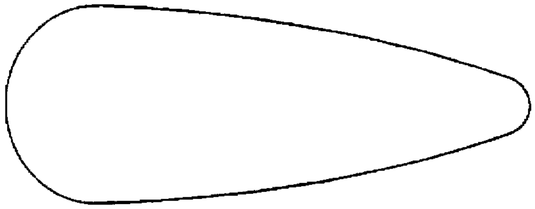
Fig. 6(d) PRIOR ART
Figure 6E:
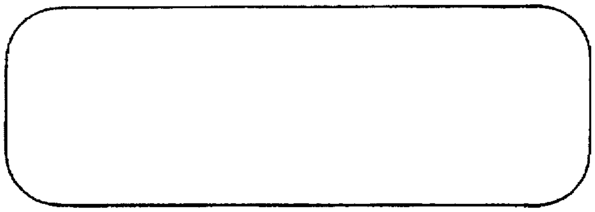
Fig. 6(e) PRIOR ART

Each tool head shown in FIGS. 7 through 17 and 19 has an identically shaped tool eye having an upper aperture 31 and a lower aperture 32 with the tapered tool head surface 30 extending therebetween. The tool eye configuration shown in each of these tools replaces various prior art tool eye cross-sections examples of which are shown in FIG. 6. The circular tool eye (FIG. 6a) and parallelogram tool eye (FIG. 6e) may be found in various types of sledge or other hammer configurations. The tool eye cross-sections in FIG. 6b, 6c, and 6d show tool eye cross-sections currently found in a prior art garden mattock or different types of axes. Various prior art oval shaped cross-sections are not shown but are replaced by the standardized shape of the tool eye made in accordance with the invention of this disclosure.

Figure 7:
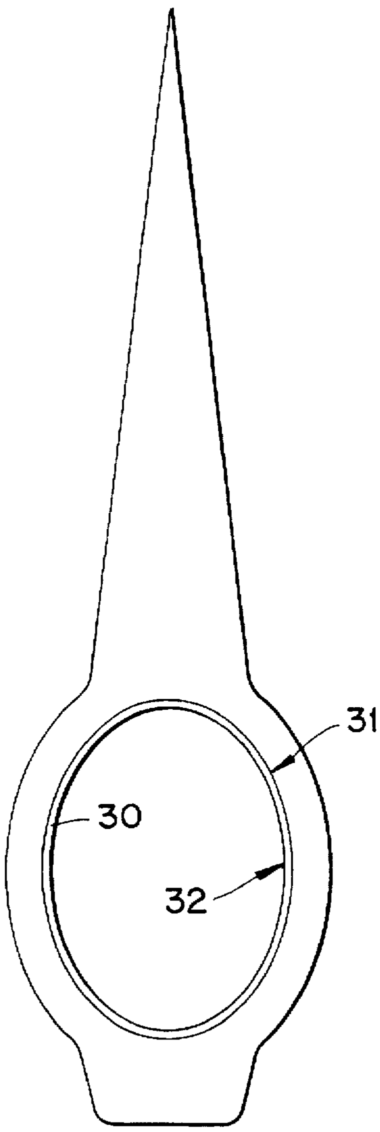
FIG. 7 is a top plan view of an American style axe made in accordance with the invention.
Figure 8:
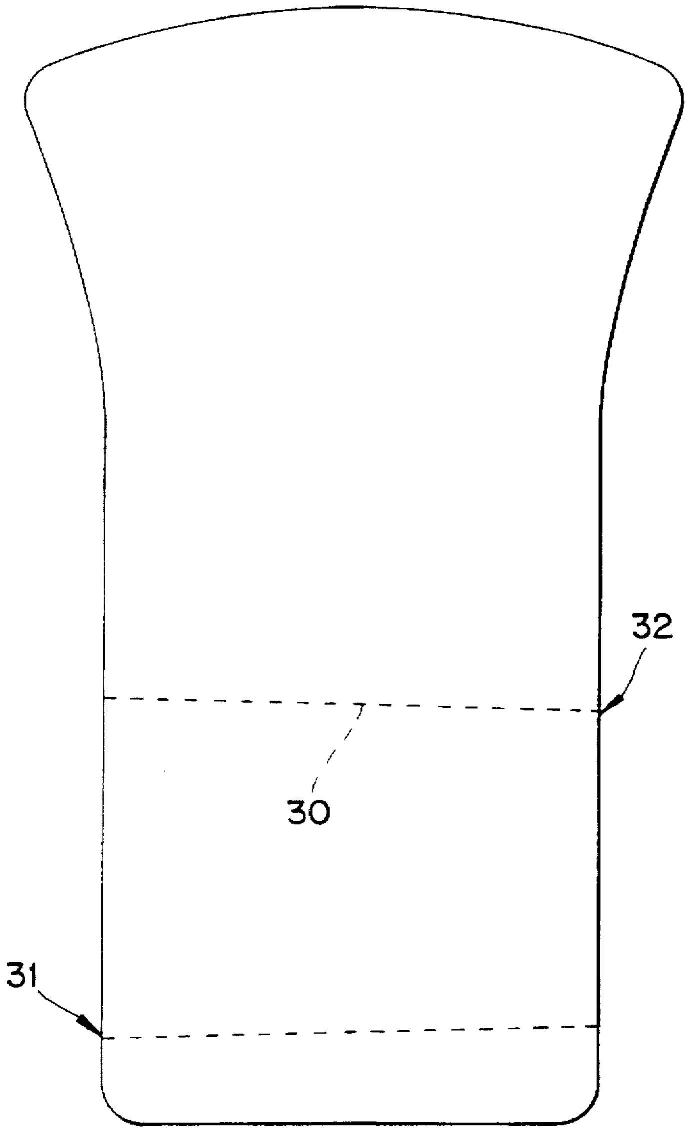
FIG. 8 is a side elevational view of the axe of FIG. 7.
Figure 9:
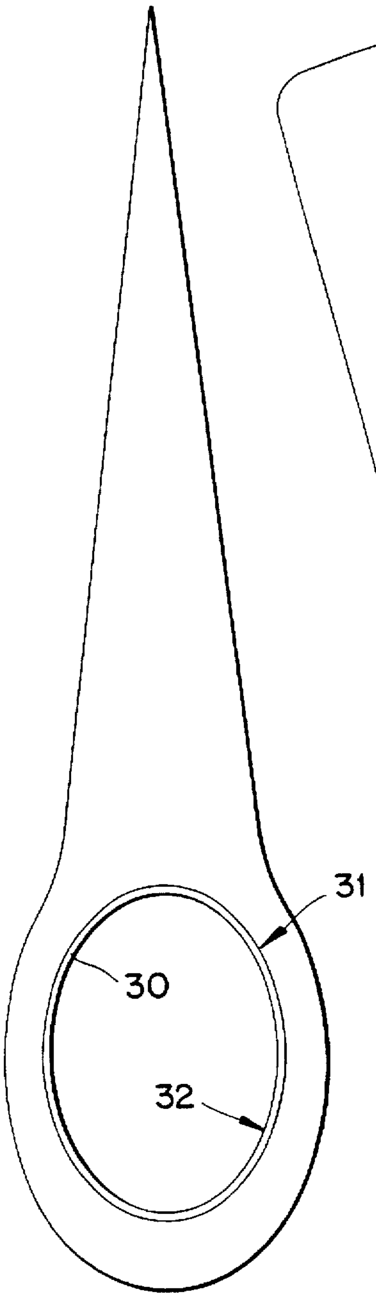
FIG. 9 is a top plan view of a Spanish style axe of the invention.
Figure 10:
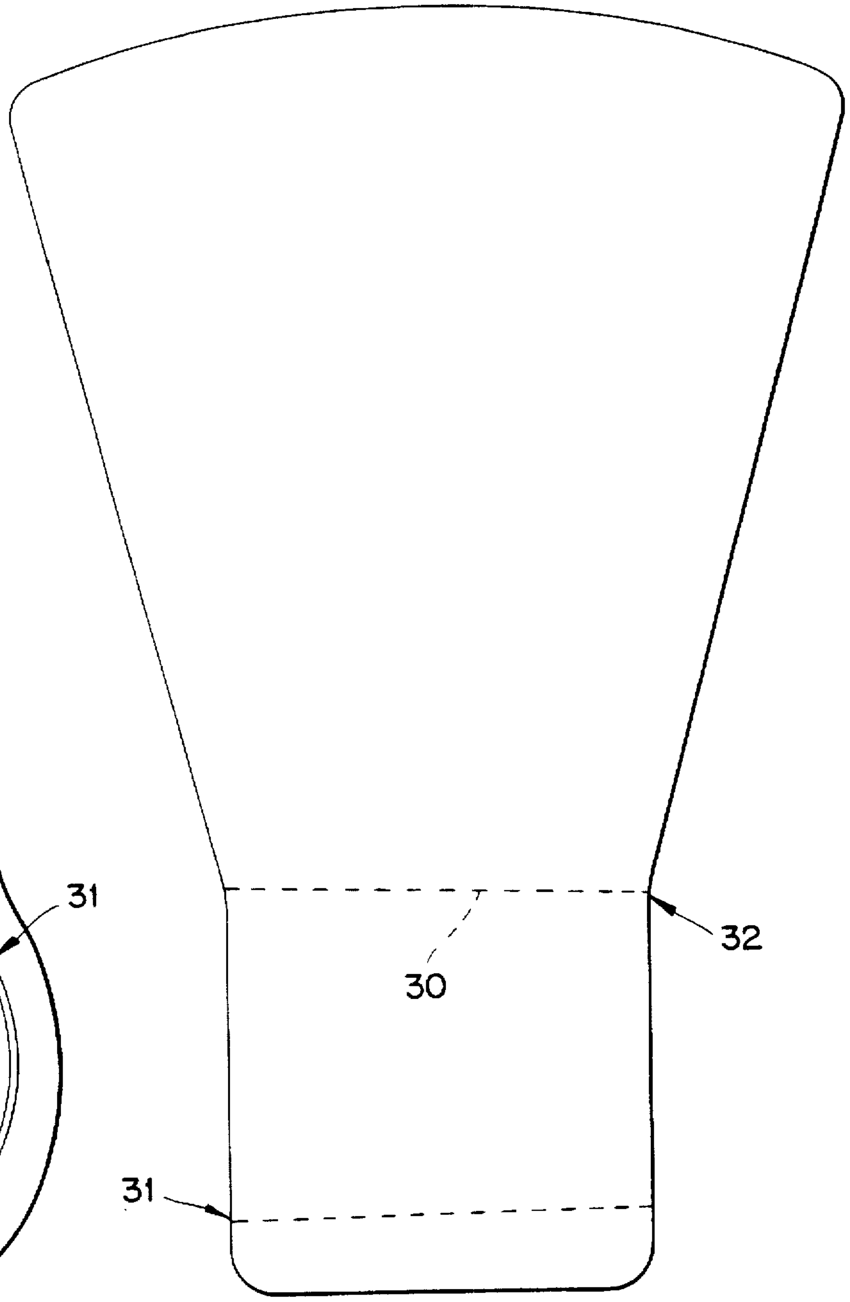
FIG. 10 is a side elevational view of the axe of FIG. 9.
Figure 11:
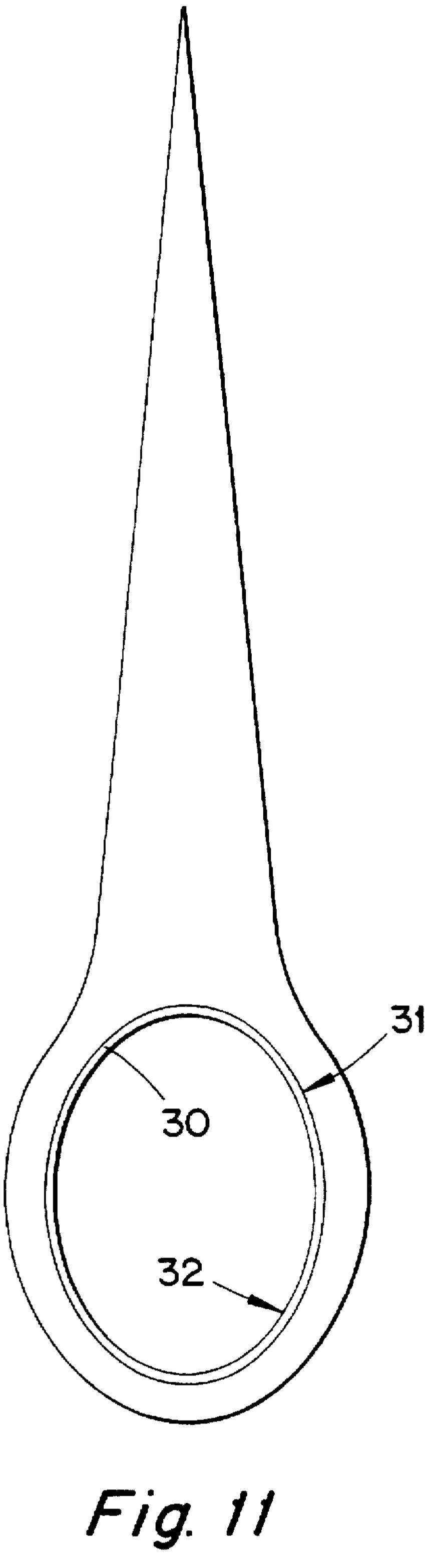
FIG. 11 is a top plan view of an African style axe made in accordance with the invention.
Figure 12:
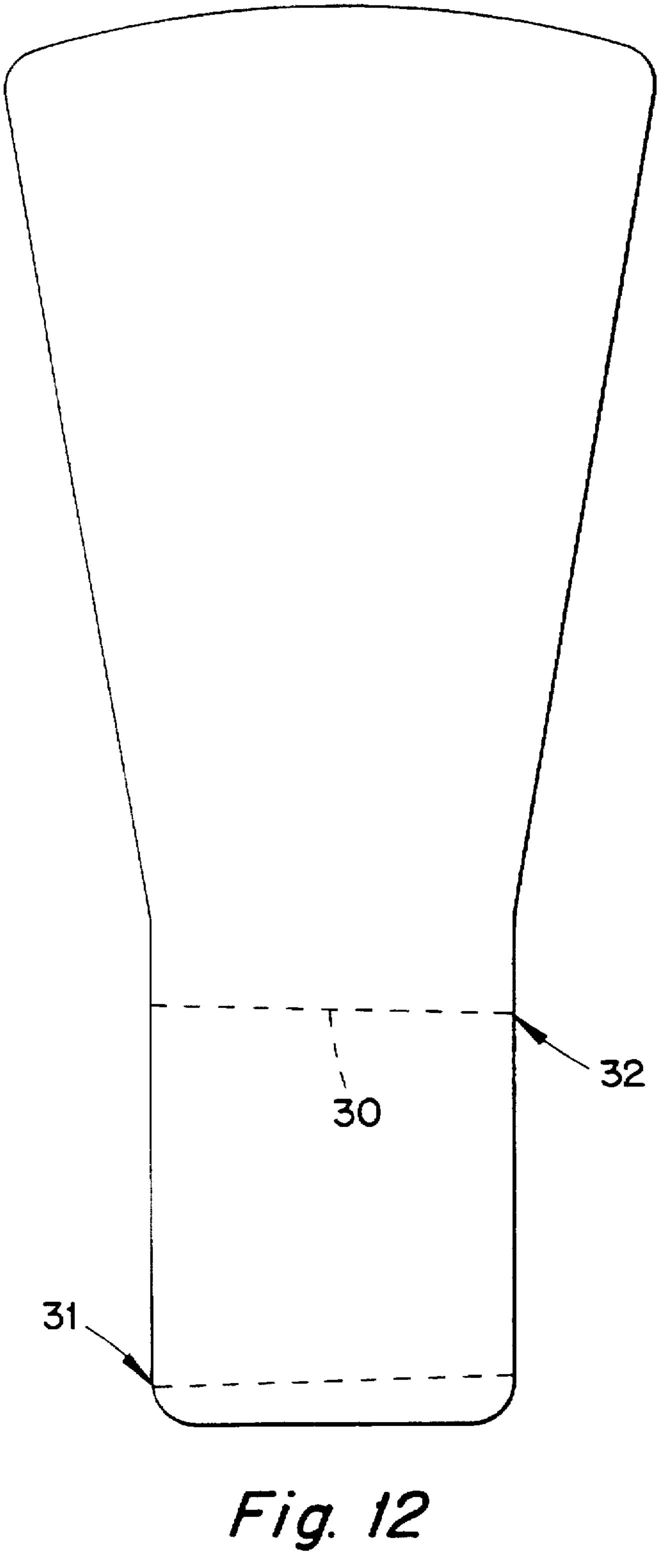
FIG. 12 is a side elevational view of the axe of FIG. 11.
Figure 13:
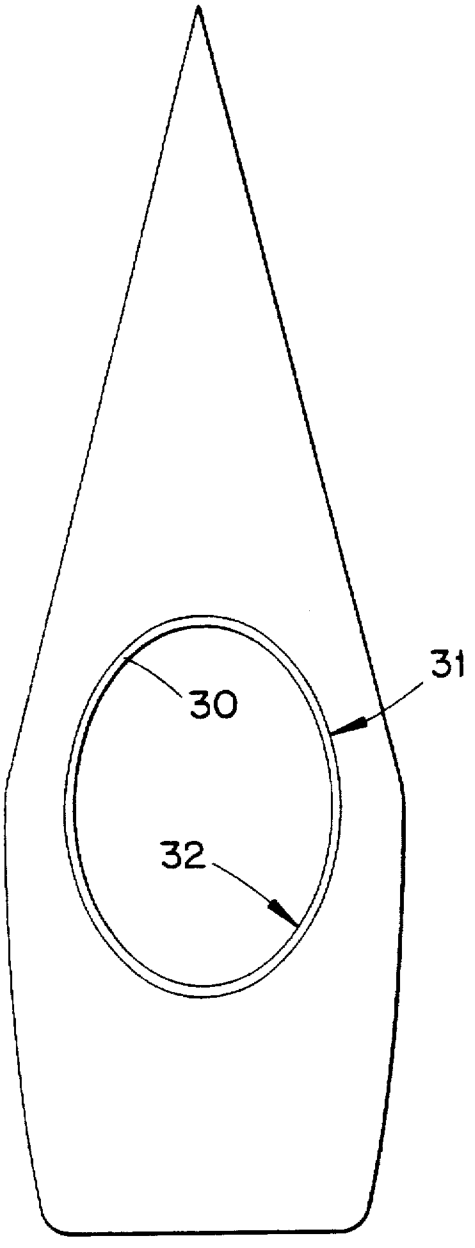
FIG. 13 is a top plan view of an Australian style maul of the invention.
Figure 14:
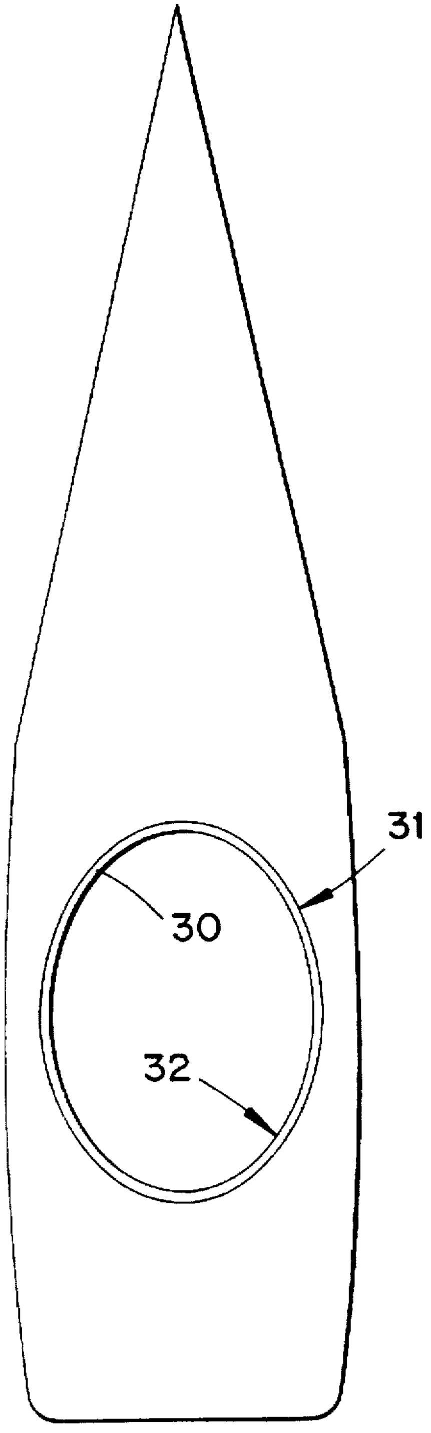
FIG. 14 is a top plan view of an American style maul made in accordance with the invention.
Figure 15:
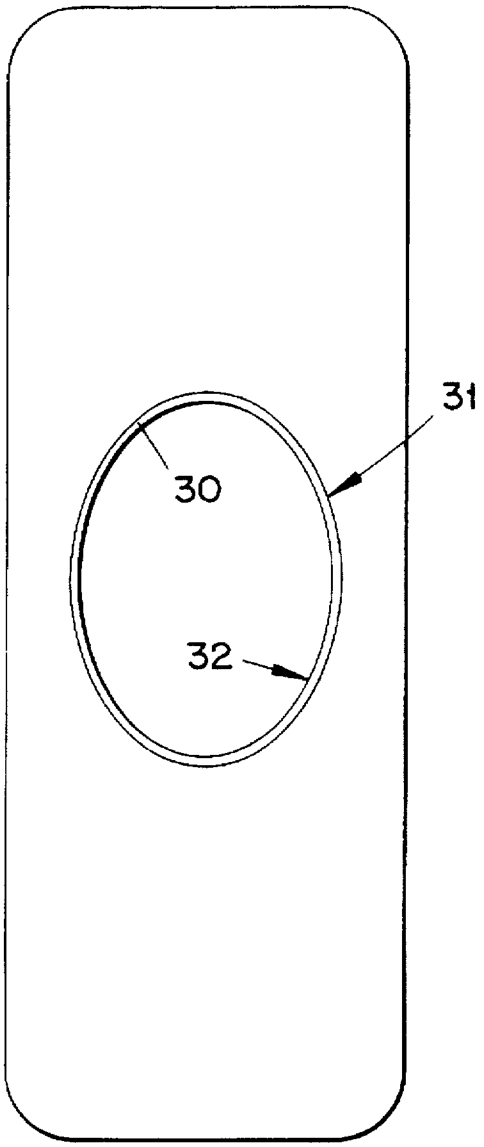
FIG. 15 is a top plan view of a sledge hammer made in accordance with the invention.
Figure 16:
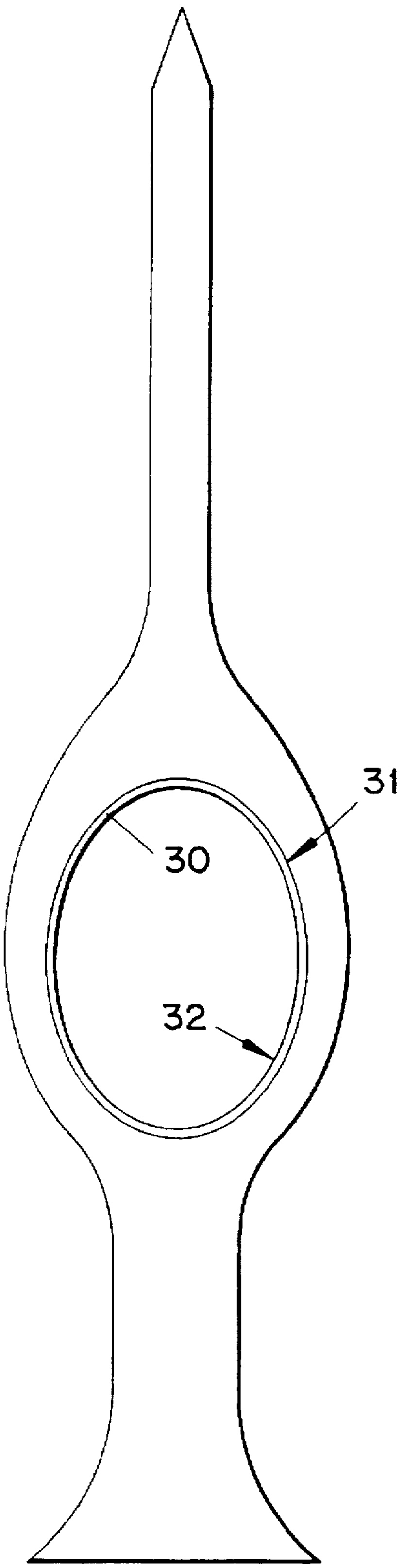
FIG. 16 is a top plan view of a garden mattock made in accordance with the invention.
Figure 17:
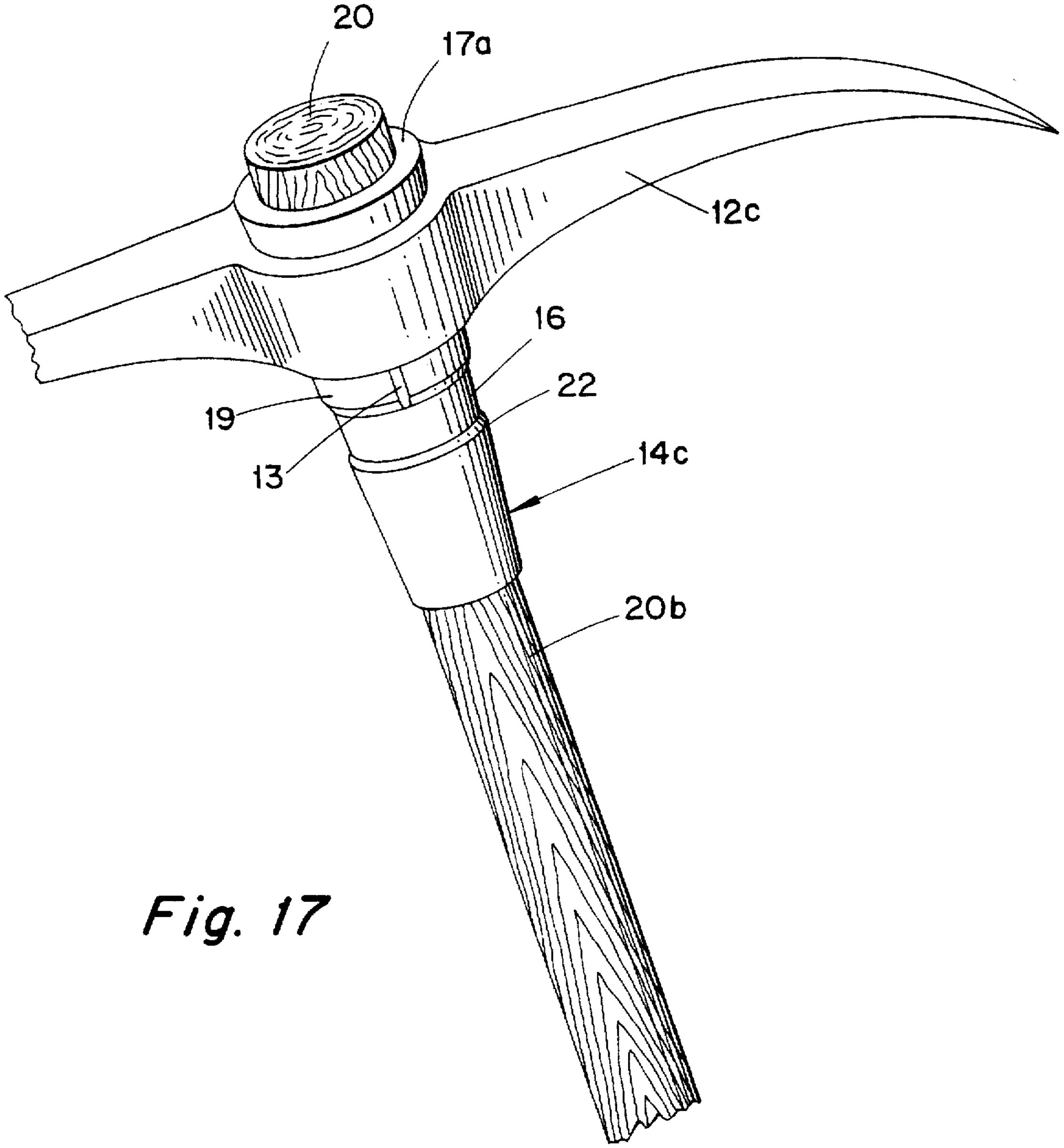
FIG. 17 is a fragmentary perspective view of a railroad pick assembly of the invention.

A 3½ pound American style axe shown in FIG. 7 and 8 includes the tool eye configuration of the present invention. A 4½ pound Spanish style axe is shown in FIGS. 9 and 10. A 2½ pound African style axe is shown in FIGS. 11 and 12. A 6 pound Australian style maul (FIG. 13), a 6 pound American style maul (FIG. 14), an 8 pound sledge hammer (FIG. 15), and a garden mattock (FIG. 16) each incorporate the same tool eye configuration of the invention for receiving sleeve member 14 of the invention. An assembled American style maul is shown in FIG. 19. The referenced weights are nominal and used only for descriptive purposes. The system of this invention is applicable to any striking tool regardless of weight.

A standard pick eye of railroad pick 12*c* (FIG. 17) has a slightly larger outside diameter along its major and minor axes than the eye configuration shown in other tool heads made in accordance with the invention. Sleeve member 14*c*, however, has the same tapered inner bore configuration as in sleeve member 14 used with the novel tapered eye configuration for tool heads of the invention (FIG. 7 through 16 and FIG. 19). Thus, tool handle 20 may be used with all of the novel tool head assemblies of the invention.

FIG. 18 shows the preselected elongated tool handle having a tapered tool supporting surface 20*a* and a hand grasping section 20*b* extending downwardly from tool supporting surface 20*a*.

The maul axe tool head 12*d* of FIG. 19 is mounted to sleeve member 14*d* having, as in earlier embodiments, flex slots 13*a*, recess 16*a*, overstrike portion 22*a*, and retaining section 19*a*. Sleeve member 14*d* of this embodiment is substantially identical to sleeve members 14 in the embodiments of FIGS. 1–16. Handle member 20 as shown in FIG. 18 fits all of the tool head assemblies made in accordance with this invention.

While the striking tool head system and common elongated handle for multiple tool head assemblies has been shown and described in detail, it is obvious that this invention is not to be considered as limited to the exact form disclosed, and that changes in detail and construction may be made therein within the scope of the invention without departing from the spirit thereof.

Having thus set forth and disclosed the nature of this invention, what is claimed is:

1. A striking tool head assembly comprising:

a) tool head means including a tool eye having disposed therein sleeve means for receiving elongated tool handle means to perform a manual tool work operation, b) said tool eye including a continuous interior surface having a top aperture at an upper surface of the tool head means and a bottom aperture at a lower surface of the tool head means, c) said sleeve means having a longitudinal axis and including an annular wall structure having an inner tapered bore surface, an exterior surface, an upper aperture end, a sleeve top end opening, and a smaller bottom end opening, d) the exterior surface of the sleeve means including a tool eye mating portion, an overstrike portion, and retaining means for securing the location of the sleeve means in a sleeve means securing position within the tool eye, and e) flexing means for enabling the annular wall structure to temporarily collapse inwardly for the retaining means to be located in said sleeve means securing position when the sleeve means is moved in a longitudinal axial direction into one of the tool head eye apertures, f) said inner tapered bore surface being effective to slidingly receive an elongated handle member having a tapered tool supporting surface that frictionally mates with the inner tapered bore surface when the elongated handle member is slidingly moved in said longitudinal axial direction through the sleeve means from the sleeve top end opening, g) said overstrike portion of the sleeve means is tapered inwardly toward said smaller bottom end opening from the retaining means which is disposed at a location intermediate a top outer free end and a bottom outer free end of the sleeve means, h) said continuous interior surface of the tool eye is tapered inwardly through the tool head means from said top aperture to a smaller said bottom aperture, i) said retaining means including a retaining ledge surface portion that extends in a direction normal to said longitudinal axis of the sleeve means, j) said tool eye mating portion is tapered from the upper aperture end to the retaining ledge surface portion and frictionally mates with the interior surface of the tool eye when disposed in the sleeve means securing position with the retaining ledge surface portion being disposed contiguously to the lower surface of the tool head means.

2. An assembly as defined in claim 1 wherein the continuous interior surface of the tool eye is tapered inwardly through the tool head means from said top aperture to a smaller said bottom aperture.

3. An assembly as defined in claim 1 wherein the retaining ledge surface portion includes an annular shoulder surface, and the flexing means includes flex slot means extending in a direction transverse to a plane containing the annular shoulder surface.

4. An assembly as defined in claim 1 wherein the annular wall structure includes a top outer free end section that projects upwardly from the upper surface of the tool head means when the sleeve means is disposed in the sleeve means securing position.

5. An assembly as defined in claim 1 wherein the exterior surface of the sleeve means includes damage control recess means located adjacent the retaining means and along the overstrike portion to prevent damage to the exterior sleeve surface when the sleeve means is moved through the tool head eye.

6. An assembly as defined in claim 1 wherein the tool head means is an axe, a maul, a sledge, a hammer, a pick or a garden mattock.

7. A striking tool head assembly comprising:

a) tool head means including a tool eye having disposed therein sleeve means for receiving elongated tool handle means to perform a manual tool work operation, b) said tool eye including a continuous interior surface having a top aperture at an upper surface of the tool head means and a bottom aperture at a lower surface of the tool head means, c) said sleeve means including an annular wall structure having an inner tapered bore surface and an exterior surface, d) the exterior surface of the sleeve means including a tool eye mating portion, an overstrike portion, and retaining means for securing the location of the sleeve means in a sleeve means securing position within the tool eye, and e) flexing means for enabling the annular wall structure to temporarily collapse inwardly for the retaining means to be located in said sleeve means securing position when the sleeve means is moved in a longitudinal axial direction into one of the tool head eye apertures, f) the exterior surface of the sleeve means is tapered inwardly from a sleeve top free end to a sleeve bottom free end, g) the continuous interior surface of the tool eye is tapered inwardly through the tool head means from said top aperture to a smaller said bottom aperture and frictionally mates with the tool eye mating portion of the sleeve means which is disposed in the sleeve means securing position, and h) the retaining means including a retaining ledge surface portion disposed at a location intermediate said two free ends of the sleeve means, and i) the flexing means including flex slot means extending in a direction transverse to a plane containing the retaining ledge surface portion which is disposed contiguously to the lower surface of the tool head means.

8. An assembly as defined in claim 7 wherein the sleeve means includes a sleeve member frictionally disposed within the tool eye, and the flex slot means includes a plurality of slot members extending completely through the annular wall structure.

9. An assembly as defined in claim 8 wherein the slot members are elongated, have closed ends, and transversely extend across the retaining ledge surface portion.

10. An assembly as defined in claim 9 wherein the inner tapered bore surface has an oval cross-section with major and minor axes and said plurality of slot members includes a slot member located in the wall structure along each of the major and minor axes on opposite sides of the sleeve member.

11. A tool head system in which an elongated tool handle has a structural configuration effective for use with each of a plurality of tool head means for performing different respective manual work operations, said system comprising:

a) a plurality of tool head means each of which tool head means is effective to perform a different manual work operation, b) each said tool head means including sleeve means and a tool eye for receiving the sleeve means, c) each said tool eye including continuous interior surface means having a top aperture at an upper surface of each said tool head means and a bottom aperture at a lower surface of each said tool head means, d) each said sleeve means including annular wall means to receive said elongated tool handle into each said tool head means for forming striking tool assembly means to perform a manual work operation selected from said plurality of tool head means having different respective manual work operations, e) each said annular wall means including exterior surface means and inner tapered bore means that is tapered inwardly from a sleeve top free end to a sleeve bottom free end, f) said inner tapered bore means including an inner frictionally mating surface means for frictionally mating with said elongated tool handle when said tool handle moves from said sleeve top free end to said sleeve bottom free end in a longitudinal axial direction through the inner tapered bore means, g) said exterior surface means including a tool eye mating portion and an overstrike portion which projects downwardly from said lower surface of each said tool head means along said tool handle that is frictionally mated with surface means of said inner tapered bore means.

12. A system as defined in claim 11 wherein each said sleeve means includes retaining means for securing the location of said sleeve means in the tool eye of each said tool head means when each said sleeve means is slidingly inserted into said tool eye, said retaining means being located intermediate said tool eye mating portion and said overstrike portion.

13. A system as defined in claim 11 wherein each said sleeve means includes flexing means for enabling said tool eye mating portion to temporarily collapse inwardly for each said sleeve means to be inserted into a sleeve means securing position when said sleeve means is moved in a longitudinal axial direction through the tool eye of one of said tool head means.

14. A system as defined in claim 11 wherein each said continuous interior surface means is tapered inwardly from the top aperture to the bottom aperture of each tool head means, and the tool eye mating portion of each said sleeve means is disposed in a sleeve means securing position when the tool eye mating portion of each said sleeve means frictionally mates with said continuous tapered interior surface means of said tool head means.

15. A system as defined in claim 14 wherein each said sleeve means includes retaining means disposed at a location along said exterior surface means intermediate two outer free ends of each respective annular wall means for securing each said sleeve means in said sleeve means securing position.

16. A system as defined in claim 15 wherein each said sleeve means includes flexing means for causing the tool eye mating portion of each respective said annular wall means to temporarily collapse inwardly for each said sleeve means to be located in said sleeve means securing position.

17. A system as defined in claim 11 wherein the tool eye mating portion of each said annular wall means includes a sleeve top end opening, and the overstrike portion of each said annular wall means includes a sleeve bottom end opening that is smaller than said sleeve top end opening, said inner frictionally mating surface means of each said sleeve means is effective to slidingly engage a tapered tool supporting surface of said elongated tool handle and frictionally secure the tool handle within the inner tapered bore means of said striking tool assembly means being formed.

18. A system as defined in claim 17 wherein said overstrike portion of each said exterior surface means is tapered inwardly toward the smaller sleeve bottom end opening from retaining means which is disposed at a location on said exterior surface means of each said sleeve means intermediate said sleeve top free end and said sleeve bottom free end of each said annular wall means.

19. A system as defined in claim 18 wherein said retaining means includes a retaining ledge surface portion that extends in a direction normal to a longitudinal axis of each said annular wall means.

20. A system as defined in claim 19 wherein the tool eye mating portion of each said sleeve means includes an outer surface which is tapered from the top outer free end of each annular wall means to the retaining ledge surface portion and frictionally mates with the interior surface of each said tool eye when the sleeve means is disposed in a sleeve means securing position within each respective tool eye of each tool head means.

21. A system as defined in claim 20 wherein each retaining ledge surface portion includes an annular shoulder surface around each said annular wall means, and each said sleeve means includes flex slot means extending in a direction transverse to a plane containing each respective annular shoulder surface.

22. A system as defined in claim 11 wherein said exterior surface means of each respective annular wall means is tapered inwardly from said sleeve top free end to said sleeve bottom free end and includes retaining means for securing the location of each respective sleeve means in said tool eye when the sleeve means is disposed within said tool eye of one of said tool head means, said continuous interior surface means of each respective tool eye is tapered inwardly through each tool head means from the top aperture to a smaller said bottom aperture and frictionally mates with the tool eye mating portion of each respective sleeve means when disposed in a sleeve means securing position, and each said retaining means includes a retaining ledge surface portion disposed at a location intermediate said two sleeve free ends, and each said sleeve means includes flex slot means extending in a direction transverse to a plane containing said retaining ledge surface portion.

23. A system as defined in claim 22 wherein said flex slot means includes a plurality of slot members extending completely through said annular wall means of each said sleeve means.

24. A system as defined in claim 23 wherein said slot members are elongated, have closed ends, and extend in a direction parallel to the longitudinal axis of the annular wall means across each said retaining ledge surface portion.

25. A system as defined in claim 23 wherein the frictionally mating surface means of each respective sleeve means has an oval cross-section with major and minor axes and said plurality of slot members includes slot members located in said annular wall means along the major and minor axes on opposite sides of each said sleeve means.

26. A system as defined in claim 25 wherein each said annular wall means includes opposing end wall sections that are located at opposite ends of each respective major axis and extend along a length of each said sleeve means and said slot members located in said annular wall means includes a slot member located in each of said opposing end wall sections.

27. A system as defined in claim 25 wherein each said annular wall means includes opposing side wall sections that are located at opposite ends of each said minor axis and extend along the entire length of each said sleeve means and said slot members located in said annular wall means includes a slot member in each of the opposing side wall sections.

28. A system as defined in claim 11 wherein the exterior surface means of each said annular wall means includes retaining means and damage control recess means, said retaining means being effective to secure the location of each respective sleeve means which is disposed in each respective tool eye, each said damage control recess means being located adjacent each retaining means and along said exterior surface means of each respective overstrike portion to prevent damage to said exterior surface means of each respective annular wall means when the sleeve means moves through the tool eye.

29. A sleeve member for use in a tool eye of a manual striking tool head means to form a tool head assembly and to receive an elongated tool handle member for performing a manual tool work operation wherein the tool head means includes a top aperture at an upper surface of the tool head means, a tool eye with a tapered interior surface, and a bottom aperture at a lower surface of the tool head means, said sleeve member comprising:

a) a protracted continuous annular wall including an inner tapered bore surface and an exterior surface having a tool eye mating portion, an overstrike portion, and retaining means for securing the sleeve member at a sleeve member securing position in the tool eye when the sleeve member is disposed within the tool eye and when said tool eye mating portion of said exterior surface of said annular wall structure mates with said tapered interior surface of said tool eye, b) said retaining means being located intermediate said tool eye mating portion and said overstrike portion, and c) flexing means for enabling the tool eye mating portion to temporarily collapse inwardly when the sleeve member is moved in a longitudinal axial direction through the top aperture of the tool eye to mate said tool eye mating portion with said tapered interior surface of the tool eye, d) the protracted annular wall includes a sleeve top end opening and a smaller bottom end opening, said top and bottom end openings being of a size end shape to receive said elongated tool handle member, e) said inner tapered bore surface being effective to slidingly receive said elongated tool handle member having a tapered tool supporting surface that frictionally mates with said inner tapered bore surface when the elongated handle member is slidingly moved in a longitudinal axial direction into the sleeve top end opening through the annular wall and out the small bottom end opening.

30. A sleeve member as defined in claim 29 wherein the retaining means includes a retaining ledge surface portion that extends in a direction normal to a longitudinal axis of the annular wall before said elongated handle is slidingly moved through the annular wall.

31. A sleeve member as defined in claim 30 wherein the tool eye mating portion of the sleeve exterior surface is tapered from the top outer free end of the annular wall to the retaining ledge surface portion and frictionally mates with the interior surface of the tool eye when disposed in the sleeve member securing position.

32. A sleeve member as defined in claim 31 wherein the retaining ledge surface portion includes an annular shoulder surface around said annular wall, and the flexing means includes flex slot means extending in a direction transverse to a plane containing the annular shoulder surface.

33. A sleeve member as defined in claim 29 wherein the exterior surface of the protracted annular wall includes damage control recess means located adjacent the retaining means to prevent damage to the exterior wall structure surface when the sleeve member is moved through the tool eye of a said tool head means.

34. A sleeve member for use in a tool eye of a manual striking tool head means to form a tool head assembly and to receive an elongated tool handle member for performing a manual tool work operation wherein the tool head means includes a top aperture at an upper surface of the tool head means, a tool eye with a tapered interior surface, and a bottom aperture at a lower surface of the tool head means, said sleeve member comprising:

a) a protracted annular wall including an inner tapered bore surface and an exterior surface having a tool eye mating portion, an overstrike portion, and retaining means for securing the sleeve member at a sleeve member securing position in the tool eye when the sleeve member is disposed within the tool eye and when said tool eye mating portion of said exterior surface of said annular wall structure mates with said tapered interior surface of said tool eye, b) said retaining means being located intermediate said tool eye mating portion and said overstrike portion, and c) flexing means for enabling the tool eye mating portion to temporarily collapse inwardly when the sleeve member is moved in a longitudinal axial direction through the top aperture of the tool eye to mate said tool eye mating portion with said tapered interior surface of the tool eye, d) the exterior surface of the protracted annular wall is tapered inwardly from a sleeve top free end to a sleeve bottom free end, e) the continuous interior surface of the tool eye is tapered inwardly through the tool head means from the top aperture to a smaller bottom aperture and frictionally mates with the tool eye mating portion when disposed in the sleeve member securing position, f) the retaining means includes a retaining ledge surface portion disposed intermediate said two sleeve free ends, and g) the flexing means includes a plurality of slot members located in and extending completely through said annular wall and extending in a direction transverse to a plane containing the retaining ledge surface portion, h) the slot members are elongated, have closed ends, and extend in a direction parallel to the longitudinal axis of the sleeve member, and transversely across the retaining ledge surface portion.

35. A sleeve member for use in a tool eye of a manual striking tool head means to form a tool head assembly and to receive an elongated tool handle member for performing a manual tool work operation wherein the tool head means includes a top aperture at an upper surface of the tool head means, a tool eye with a tapered interior surface, and a bottom aperture at a lower surface of the tool head means, said sleeve member comprising:

a) a protracted annular wall structure including an inner tapered bore surface and an exterior surface having a tool eye mating portion, an overstrike portion, and retaining means for securing the sleeve member at a sleeve member securing position in the tool eye when the sleeve member is disposed within the tool eye and said tool eye mating portion of said exterior surface of said annular wall structure mates with said tapered interior surface of said tool eye, and b) flexing means for enabling the annular wall structure to temporarily collapse inwardly when the sleeve member is moved in a longitudinal axial direction through the top aperture of the tool eye to mate said tool eye mating portion with said tapered interior surface of the tool eye, c) said inner tapered bore surface having an oval cross-section with major and minor axes, end d) said flexing means including slot members located in the wall structure along the major and minor axes on opposite sides of the sleeve member.

36. A sleeve member as defined in claim 35 wherein the wall structure includes opposing end wall sections that are located at opposite ends of said major axis and extend along a length of the sleeve member, said slot members include a slot member located in each of said opposing end wall sections.

37. A sleeve member as defined in claim 35 wherein the wall structure includes opposing side wall sections that are located at opposite ends of said minor axis and extend along the entire length of the sleeve member, said slot members include a slot member located in each of the opposing side wall sections.

* * * * *